3,023,164
METHOD OF LUBRICATION COMPRISING THE USE OF METAL PHTHALOCYANINE
Emil A. Lawton, Woodland Hills, Calif., and Charles M. Allen and Stanley Cosgrove, Columbus, Ohio, assignors to Battelle Memorial Institute, Columbus, Ohio, a corporation of Ohio
No Drawing. Filed May 21, 1958, Ser. No. 736,693
5 Claims. (Cl. 252—49.7)

This invention relates to a new lubrication system involving new lubricants, lubricated bodies, and methods of lubrication. More particularly, it relates to phthalocyanine lubricants and systems of phthalocyanine lubrication.

In the present state of the art of high-temperature lubrication, there are many major difficulties. Perhaps foremost among the difficulties is the lack of suitable lubricating systems which will lubricate saitsfactorily at temperatures in excess of 600° F. The temperature range of 600° F. and higher excludes present liquid lubricants and, at least in the present state of art, necessitates the use of solid lubricants. Although many solid lubricants have been tried for use in this temperature range, and although some of these have had a partial measure of success, the fact remains that useful and satisfactory high-temperature solid lubricants and solid lubrication systems are still being sought. One of the primary purposes for which such high-temperature lubrication systems are being sought is for use in the field of high-temperature bearings and gears.

Suitable lubrication systems are also lacking which will provide satisfactory lubrication throughout the temperature range of —90° F. to 1500° F. Applications such as those in the aircraft field require such properties.

It is an object of this invention to provide the needed high-temperature lubrication system. It is a further object to provide new high-temperature lubricants for such systems. It is another object to provide a lubrication system which will lubricate with stability in a temperature range above 600° F.

Still another object of the present invention is to provide new and useful lubricant compositions for lubrication of high-temperature bearings and gears, and for other high-temperature lubrication purposes. Yet another object and feature of this invention is to provide a novel lubricated massive body as a new composition of matter.

Many other objects and features of the present invention will become apparent as the description proceeds.

Phthalocyanines have been used for many years as high-intensity synthetic dyes. The properties of phthalocyanies in high-temperature lubrication systems, however, have gone unrecognized. We have discovered high-temperature lubrication systems involving phthalocyanines as the lubricant.

Phthalocyanine is the name given to the tetrabenzotetraazaporphin structure. The molecule is planar and has a condensed polycyclic structure. The structure of metal-free phthalocyanine is set forth below:

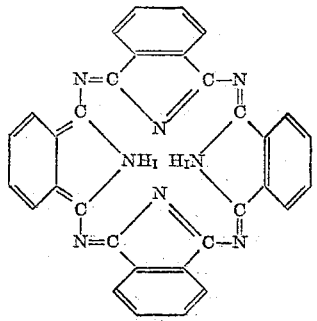

The structure has two internal hydrogen atoms, $H_I$, which can be removed and replaced by certain metals. For example, the two internal hydrogen atoms of metal-free phthalocyanine can be replaced by a single bivalent copper atom to form copper phthalocyanine, a brilliant blue dye. We have discovered that, seemingly due in part to the combination of (1) the planar structure of the metal-free phthalocyanine molecule, (2) its extreme stability due to its extensive chemical bond conjugation, and (3) the reactivity of the center of the molecule with metals, the metal-free phthalocyanine when placed between two metal bearing surfaces at high temperature provides superior lubrication in the temperature range of 600° F. to 1200° F. and satisfactory lubrication in the temperature range of —90° F. to 1500° F.

As part of the present invention, we provide a method of lubricating a metal bearing surface at high temperature, in excess of 600° F., which method comprises contacting this bearing surface with a phthalocyanine, the phthalocyanine being characterized by an ability to react chemically with the metal of the bearing surface to form a coating of phthalocyanine in situ; then, while maintaining this contacting relationship, applying high temperature and high pressure under bearing conditions to said contacted bearing surface whereby a coating of phthalocyanine is formed in situ; and then operating the resulting coated bearing surface in high-temperature bearing contact.

We also provide a method of treating with lubricant a massive body, such as a bearing, having a metallic surface. In this method the metallic surface is contacted with a suitable phthalocyanine in such manner as to form a coating on the surface of the body of phthalocyanine in situ. A highly preferred such suitable phthalocyanine is metal-free phthalocyanine. We thus also provide the treated massive body.

Additionally, we include in our new lubricant system the use of a new composition of matter, which is a phthalocyanine, which has highly desirable properties of high-temperature solid lubrication. This new composition of matter is polymeric tetrabenzotetraazaporphin.

There are several known methods of preparing phthalocyanines. By these methods, phthalocyanines may be obtained in good yields. However, in attempting to extend these prior preparatory procedures to the production of a metal-free polymeric tetrabenzotetraazaporphin, serious difficulties are encountered. In attempting to extend some of the methods taught in the art to the preparation of this polymer, no yield of the polymer is obtained. The other methods taught could not be extended, since necessary reactants are not available.

As an example of the former situation, phthalic anhydride was reacted with pyromellitic dianhydride in the presence of cupric chloride, urea, and a molybdate catalyst. A completely cross-linked copper tetrabenzotetraazaporphin polymer was obtained by this procedure, but this method is not suitable for preparing the highly desirable metal-free polymeric phthalocyanine.

With respect to the latter situation, a method of preparing monomeric metal-free phthalocyanine involves adding phthalonitrile to hot sodium amylate and then treating the precipitate formed wtih the ammonium salt of an acid in the presence of a high boiling solvent. It was felt that this method could possibly be modified to produce a phthalocyanine polymer if pyromellitic tetranitrile (1,2,4,5-tetracyanobenzene) could be synthesized for use as a reactant, since pyromellitic tetranitrile was not available. Thus, the discovery of a process for preparing pyromellitic tetranitrile, and in good yield, was necessary to attempt the preparation of the metal-free polymeric tetrabenzotetraazaporphin by this modified method.

After many unsuccessful attempts to apply "conventional" methods of dehydration to such materials as pyromellitic tetraamide, in order to prepare pyromellitic tetranitrile, experimentation yielded a method of successful preparation. Among others, the "conventional" dehydrating agents for this type of reaction, acetic anhydride, phosphorus oxychloride, and phosphorus pentoxide, were unsuccessful in this application. It was discovered, however, that treating pyromellitic tetraamide with thionyl chloride at a temperature above 60° C. yielded the pyromellitic tetranitrile. The reaction is sensitive and more than one treatment with thionyl chloride may be necessary to obtain the pyromellitic tetranitrile in good quantity.

The metal-free polymeric tetrabenzotetraazaporphin is a new and unique composition of matter. As is discussed, it exhibits many useful properties and represents a considerable improvement over other materials used for similar purposes.

The following example is illustrative of a preferred method of preparing tetrabenzotetraazaporphin polymers.

Ten grams of pyromellitic tetraamide were dissolved in 56 grams of N,N-dimethylformamide. While N,N-dimethylformamide was selected as the solvent for the purpose of this experiment, another aryl- or alkyl-substituted formamide might also be selected by one skilled in the art as a satisfactory solvent. The temperature of the solution was raised to 60° C. Thionyl chloride, in a ratio of 4 moles for each mole of pyromellitic tetraamide, was added slowly to the solution with stirring. The reaction mixture was heated for about seven hours at 60° C. After cooling, preferably to 0–25° C., dilute hydrochloric acid was added to the reaction mixture to decompose any unreacted thionyl chloride, and the mixture was then filtered. The filter cake was washed with water until the washings were neutral to litmus. After several hot filtrations from boiling glacial acetic acid, two separate fractions were obtained.

Fraction 1 recrystallized from the combined acid filtrates and contained pyromellitic tetranitrile. Tricyanobenzamide was also present in this fraction. The identity of the pyromellitic tetranitrile was verified by an elemental analysis, infrared spectrum, and the fact that a positive sodium amylate test resulted. The pyromellitic tetranitrile exhibited rather unusual melting point characteristics in that, at about 200° C. the material began to turn green; the color intensified as the temperature rose and abruptly at 260° C. the material melted and fused into a purple mass.

Fraction 2, which was insoluble in boiling glacial acetic acid, had a very high melting point, approximately 450–456° C., and its infrared spectrum indicated that it was pyromellitic diimide.

To increase the yield of the pyromellitic tetranitrile, about 5 grams of the crude material, Fraction 1, from the above reaction was dissolved in N,N-dimethylformamide and treated with an additional 12 milliliters of thionyl chloride. The reaction mixture was stirred at 60° C. for two hours, cooled to room temperature, and poured slowly, with stirring, into about a liter of crushed ice. The solid precipitate was filtered off and washed with water until the washings were neutral to litmus. The material was fractionated by repeated hot filtrations in glacial acetic acid, 3 to 5 filtrations usually being sufficient. The acid-insoluble fraction was found to be pyromellitic diimide. The pale tan powder which precipitated from the combined filtrates upon cooling was collected, washed, and recrystallized from boiling ethanol.

The pyromellitic tetranitrile thus obtained was in the form of white needles and platelets and exhibited a melting point of 258° C. An elemental analysis showed carbon 67.0 percent; hydrogen 1.5 percent; and nitrogen 31.2 percent. The theoretical calculated elemental analysis for pyromelletic tetranitrile is carbon 67.4 percent; hydrogen 1.1 percent; and nitrogen 31.5 percent. The infrared spectrum showed a strong CN band at 4.5 microns; aromatic ring vibrations between 6.7 and 8.2 microns; CH stretching at 3.2 and 3.3 microns; and 1,2,4,5-substitution at 10.8 microns.

The preferred temperature range for the thionyl chloride treatments is between 60 to 90° C. Below 60° C., the reaction proceeds, if at all, very slowly. Above 90° C., competing side reactions appear to predominate.

The pyromellitic tetranitrile was then added to boiling sodium amylate. The solution was then filtered. The precipitate was treated with a mixture of several grams of ammonium sulfate to scavenge the sodium and sufficient benzyl alcohol to form a low-viscosity slurry and heated at 180° C. for about 40 minutes. The solution was then filtered at 120° C., yielding the metal-free tetrabenzotetraazaporphin polymer as a precipitate. In the above steps, the sodium amylate treatment yielded the sodium salt of the polymer. The subsequent treatment of the sodium salt with an ammonium salt of an acid with $K_A$ (dissociation constant) greater than $1 \times 10^{-4}$ in the presence of a high-boiling-point solvent, such as benzyl alcohol or trichlorobenzene, produces the desired metal-free tetrabenzotetraazaporphin polymer.

It is seen that, in a sheet-type polymer configuration, only two hydrogen atoms are available on each benzene structure for substitution purposes. Depending on the use to which a particular polymer is to be put, the fact or degree of substitution may be chosen. The common monomer substitution and manner of substitution may be used for these positions, if desired, in the polymer. We prefer the nonsubstituted polymer for coating and lubricant uses since the planar structure of the molecule is best maintained by use of the nonsubstituted metal-free phthalocyanine polymer.

It was found experimentally that, if metal-free phthalocyanine is situated between two bearing surfaces, the bearing surfaces being at a temperature of from about 600° F. to about 1200° F., and if one of said surfaces is moved in a rubbing relationship with the other of said surfaces, the metal-free phthalocyanine acts in a superior manner as a high-temperature solid lubricant. Thus, it is a feature of the present invention to form a solid lubricant layer consisting essentially of a phthalocyanine between two bearing surfaces and moving one of the surfaces in rubbing relationship with the other of the surfaces. In this manner also, satisfactory lubrication is provided in a temperature range of from about −90° F. to about 1500° F. "Rubbing relationship," as used herein, is that relationship normally found in operating bearing surfaces, whether rolling, sliding, extrusion, or otherwise.

It is a feature of this invention to form a lubricant layer consisting essentially of a phthalocyanine in situ on at least one of two opposing bearing surfaces, and then to move one of the surfaces in rubbing relationship with the other of the surfaces in the temperature ranges set forth above. One preferred feature is to place a polytetrabenzotetraazaporphin between the two bearing surfaces before moving them in the rubbing relationship set forth above.

It is a feature of this invention to minimize friction between bearing surfaces by lubricating the surfaces with a material consisting essentially of a phthalocyanine. The temperature range over which this method of minimizing friction is satisfactory is from about −90° F. to about 1500° F. In the temperature range of from about 600° F. to about 1200° F., this method is greatly superior to other known methods.

Pretreatment of the metal bearings with a lubricating coating can be accomplished by contacting the metal-containing surface of the bearing with a phthalocyanine capable of reacting with the metal in such manner as to form a coating on the surface of a metal phthalocyanine in situ. A highly preferred such reactive phthalocyanine is a metal-free phthalocyanine. Such coating of a massive body with a metal-containing surface can be accomplished due to the reactivity of the center of the preferred phthalocyanine molecules and the corresponding ability of this molecule to react with the metal of the surface. The fact that a thermally-stable coating-producing substance can be used enables pretreatment at operating temperature ranges of 600° to 1500° F.

With respect to the bearing materials of this invention, those bearing materials are preferred which contain a metal capable of forming a stable covalent phthalocyanine, i.e. a covalent phthalocyanine which can be sublimed unchanged at a temperature of about 400° C., or higher, in a vacuum or an inert atmosphere under pressure. These metals shall be referred to as stable-phthalocyanine-forming metals. Known to be included in this group are the metals, copper, nickel, zinc, cobalt, aluminum, platinum, iron, vanadium, and titanium. Of course, preferred bearings may contain other materials; all that is required is enough of the stable-phthalocyanine-forming metal, or metals, in the bearing surface to provide sufficiently for formation of the phthalocyanine layer, in situ, on the bearing. For example, one highly preferred bearing material is a titanium carbide cermet.

Whether or not pretreatment is desired or accomplished in any given instance, it will usually be desirable to have a continuous lubricant replenishment system during operation of the bearing. Preferred for use in such a lubricant replenishment system is a solid lubricant composition in which the lubricating agent consists essentially of a suitable phthalocyanine in particulate form, the preferred particle size being less than about 100 microns. As will be specified in greater detail, the most highly preferred compositions are solid-gas mixtures in which the solid constituent consists essentially of metal-free phthalocyanine in particulate form, and the gaseous constituent consists essentially of a relatively inert gas, such as nitrogen, argon, or helium, so that the gas itself will not be reactive in the lubricant replenishment system. Other inert fluid lubricant carriers which are stable in character from −90° F. to 1500° F. may be used if desired. Certain halogenated-hydrocarbon aerosols may also be satisfactory.

When a new composition of matter, the metal-free phthalocyanine polymer, is used as the high-temperature solid lubricant of the present invention, its reaction with the metal surface of the bearing produces a novel product comprising a massive body having a metal surface in which the surface of the metal is at least partially converted to a polymeric phthalocyanine characterized by the general formula:

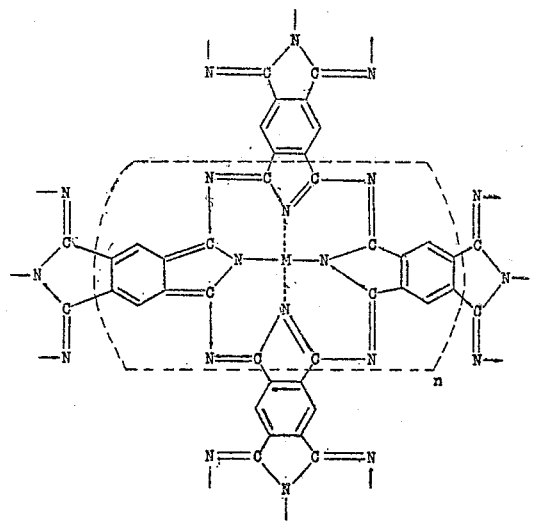

where $n$ is an integer greater than one and M is a metal atom of the surface. The metal atom M of the high-temperature bearing surfaces is preferred to be a stable-phthalocyanine-forming metal. Of these, iron and titanium are preferred. Because of the reactivity of metal-free phthalocyanines with iron under bearing conditions it is apparent that the vast group of steel and other iron-containing bearings may be treated and lubricated in the manner taught by us herein.

One series of tests made involved bearing contact using an external bearing around a shaft. The bearings were heat-treated silicon modified AMS-5540; 5580; 5665; 5687; or equivalent; the shafts were nitrided AMS-5727; 5725; 5728; or equivalent. Phthalocyanine was applied at room temperature by being mixed in a liquid carrier, polyisobutylene. Metal-free phthalocyanine and other materials were evaluated at bearing temperatures over 600° F. As an example, the metal-free phthalocyanine lubricant showed a calculated coefficient of friction of less than 0.10 in tests at bearing temperatures of both 800° F. and 1000° F., as compared to coefficients of friction at 600° F. in the same test for molybdenum disulfide of 0.16 and for boron nitride of 0.25. Thus, even at the higher temperatures, the metal-free phthalocyanine lubricant exhibited superior lubrication properties to the other two solid lubricants mentioned. Natural graphite in this test at a temperature of 600° F. showed a coefficient of friction of about 0.15. In the tests with metal-free phthalocyanine, a dark purple film was found on the shaft-bearing surfaces. This film was sometimes ruptured in places where high loads occurred; however, it was adherent and could not be scraped off with a knife. Copper phthalocyanine was evaluated at a bearing temperature of 800° F. and exhibited a coefficient of friction at this temperature of over 0.3. Thus, copper phthalocyanine was drastically inferior to metal-free phthalocyanine as a lubricant. Among other reasons for this inferiority, it is believed that copper phthalocyanine does not chemically bond to the surface of the metal bearing, since the copper-substituted material is not as reactive as the metal-free phthalocyanine. (Of course, at the high temperatures of these tests, the polyisobutylene carrier served no purpose other than to help place the metal-free phthalocyanine in position, since this comparatively low-boiling-point liquid was no longer between the bearings when the high temperatures were attained and during the tests.)

In another series of tests, several lubricants were evaluated in a Shell four-ball wear tester. The Shell four-ball wear tester constitutes a bench test machine, designed to evaluate fluids or greases for their boundary lubricating ability. In this equipment, a one-half-inch ball of SAE 52100 bearing steel is mounted in a collet on the end of a spindle. Three other one-half-inch balls are held stationary in a chuck and pressed against a rotating ball by means of a lever (load arm) and dead weight. Friction torque at the rubbing surfaces is measured with a calibrated spring and micrometer attached to a radial bar (torque arm). The four balls are enclosed in a shielded system with the lubricant to be evaluated, and the assembly is heated electrically to the desired temperature. In the apparatus as used, lubricants could be evaluated under conditions of pure sliding (up to 700 feet per minute) at a temperature of up to about 1000° F. and at initial maximum Hertzian contact stresses up to about 500,000 p.s.i. using conveniently available precision wear specimens. Since SAE 52100 wear specimens soften considerably at elevated temperatures, other conveniently available wear specimens were used. These included a cobalt base alloy, a tool steel alloy and a titanium carbide cermet. A solid-lubricant replenishing system was designed, with a gaseous lubricant carrier. Nitrogen was selected as a readily available inert gas for the replenishing system. Thus, the powdered lubricant was injected into the contact area, using low-pressure nitrogen (1–2 p.s.i.) as the carrier. Four injections, each of two seconds' duration were made per minute.

Metal-free phthalocyanine was a superior lubricant during tests on the four-ball wear machine. Judging from the color of the specimens after evaluation, metal-free phthalocyanine seemed to react best with tool steel and titanium carbide cermet materials. The tests were made at an ambient air temperature of 1000° F. and 250,000 p.s.i. initial maximum Hertzian contact stress. In addition to metal-free phthalocyanine, four other solid lubricants were evaluated. They were molybdenum disulfide, lead oxide, slate graphite, and boron nitride. The coefficient of friction with metal-free phthalocyanine was 0.01. Both slate graphite and boron nitride exhibited coefficients of friction as high as 0.04 and 0.05, respectively. Replenishment of lubricant appreciably improved the wear of the materials in the rubbing experiments in which metal-free phthalocyanine was the lubricant.

By virtue of its extensive chemical bond conjugation, metal-free phthalocyanine is fairly stable to temperatures as high as 1500° F. However, at temperatures approaching 1000° F., its sublimation pressure becomes appreciable. Experiments also indicated that metal-free phthalocyanine has satisfactory oxidation resistance at 1000° F. It is expected from its structure that the metal-free phthalocyanine bonded tenaciously to the contacting metal surfaces to form planar coatings which slid easily over each other. Experimental results showed that the metal-free phthalocyanine exhibited low initial coefficients of friction with all wear materials in practically every evaluation, thus seeming to verify this conclusion.

Because of the known sublimation characteristics of metal-free phthalocyanine, extreme high-temperature use of this material as a lubricant, at say above about 1200° F., is more satisfactory if a pressurized system is used.

Bearing tests similar to those described herein showed that it was possible to obtain satisfactory lubrication with systems utilizing the metal-free phthalocyanines throughout the temperature range of −90° F. to 1500° F. Superior lubricating properties are found within the range, 600° F. to 1200° F. The nature of these ranges is such that their discovery is usefully applicable to many important lubricant applications, for some of which there has heretofore been no promising lubrication system available.

It will be understood, of course, that while the forms of the invention herein shown and described constitute the typical or preferred embodiments of the invention, it is not intended herein to illustrate all of the possible equivalent forms or ramifications of this invention. It will also be understood that the words used are words of description rather than of limitation and that various changes may be substituted without departing from the spirit or scope of the invention herein disclosed.

What is claimed is:

1. A method of minimizing friction between metal-containing bearing surfaces comprising applying metal-free phthalocyanine to one of said metal-containing surfaces and moving said bearing surfaces in rubbing relationship to each other, while maintaining said bearing surfaces at a temperature in the range of from about 600° F. to about 1500° F. thereby forming a layer of metal phthalocyanine in situ on said surface, and thereby permitting the bearing surfaces to be moved in rubbing relationship to each other while being maintained at a temperature in the range of from about −90° F. to about 1500° F.

2. The method of claim 1 wherein the metal-free phthalocyanine is polymeric.

3. The method of claim 1 wherein the metal of the metal-containing bearing surface is selected from the group of metals consisting of: copper, nickel, zinc, cobalt, aluminum, platinum, iron, vanadium, and titanium.

4. A method of solid lubrication of opposing bearing surfaces comprising: applying metal-free phthalocyanine on at least one of two opposing bearing surfaces, said surface containing a metal capable of forming a stable covalent phthalocyanine; forming a layer consisting essentially of a metal phthalocyanine in situ on at least one of said bearing surfaces, while maintaining said surfaces at a temperature in the range of from about 600° F. to about 1500° F., and moving one of said surfaces in rubbing relationship to the second surface.

5. A method of solid lubrication of opposing bearing surfaces comprising: applying metal-free phthalocyanine on at least one of two opposing bearing surfaces, said surface containing a metal capable of forming a stable covalent phthalocyanine; forming in situ on at least one of said bearing surfaces, at a temperature in the range of from about 600° F. to about 1500° F., a layer consisting essentially of a metal phthalocyanine; and moving said bearing surfaces in rubbing relationship to each other, while maintaining said bearing surfaces at a temperature in the range of from about 600° F. to about 1500° F.

References Cited in the file of this patent

UNITED STATES PATENTS

| | | |
|---|---|---|
| 2,163,768 | Tanner | June 27, 1939 |
| 2,245,098 | Turek | June 10, 1941 |
| 2,486,351 | Wiswall | Oct. 25, 1949 |
| 2,513,098 | Kropa et al. | June 27, 1950 |
| 2,585,037 | Robinson et al. | Feb. 12, 1952 |
| 2,593,922 | Robinson et al. | Apr. 22, 1952 |
| 2,597,018 | Merker | May 20, 1952 |
| 2,836,563 | Dilworth et al. | May 27, 1958 |

OTHER REFERENCES

"Chemistry of Synthetic Dyes and Pigments," Lubs, Reinhold Pub. Corp., 1955, p. 581.

Ind. and Eng. Chem., vol. 44, pp. 556–563 (1952).

"Manufacture and Application of Lubricating Greases," Boner, Reinhold Pub. Corp., N.Y., 1954, pp. 690–697.

Dedication 3,023,164.—*Emil A. Lawton*, Woodland Hills, Calif., and *Charles M. Allen* and *Stanley Cosgrove*, Columbus, Ohio. METHOD OF LUBRICATION COMPRISING THE USE OF METAL PHTHALOCYANINE. Patent dated Feb. 27, 1972. Dedication filed Aug. 2, 1974, by the assignee, *The Battelle Development Corporation*.

Hereby dedicates to the People of the United States the entire remaining term of said patent.

[*Official Gazette April 1, 1975.*]